Oct. 22, 1963 T. M. SHAY Re. 25,465

CONTAINER

Original Filed Nov. 10, 1960 2 Sheets-Sheet 1

INVENTOR.

Thomas M. Shay,

BY

Victor J. Evans & Co.

Attorneys

CONTAINER

Original Filed Nov. 10, 1960 2 Sheets-Sheet 2

INVENTOR.
Thomas M. Shay,
BY
Victor J. Evans & Co.
Attorneys

United States Patent Office

Re. 25,465
Reissued Oct. 22, 1963

25,465

CONTAINER

Thomas M. Shay, Morehead, Ky., assignor to Shay Containers, Incorporated, Cynthiana, Ky.

Original No. 3,036,725, dated May 29, 1962, Ser. No. 68,484, Nov. 10, 1960. Application for reissue Feb. 20, 1963, Ser. No. 261,938
2 Claims. (Cl. 217—12)

Matter enclosed in heavy brackets [ ] appears in the original patent but forms no part of this reissue specification; matter printed in italics indicates the additions made by reissue.

This invention relates to a container and more particularly to a container which can be knocked down or disassembled when it is not being used.

The primary object of this invention is to provide a container or box that includes a base as well as a plurality of side members or side panels, and there is also provided a cover, and wherein there is provided an interengaging means between the cover and side members as well as an interengaging means between the base and side members so that when the parts are in their assembled position the various components will be maintained in their proper aligned location.

Another object of the invention is to provide a container which includes side members that can be readily disengaged or slid out or slid in and engaged with a base, and wherein the container is easy to assemble because the last piece taken out is the first to be used in reassembling the container or box, and wherein the container of the present invention does not require the use of nails or other fasteners to hold the parts in place since one metal band surrounding the top portion of the container will serve to hold the parts in their interlocked position.

A still further object of the invention is to provide a knocked down or collapsible box or container which includes a base that is constructed so that the side members will not collapse or bulge out, and wherein there is provided a novel interlocking means between the various components or parts so that assembly or disassembly can be readily effected or accomplished, the container being strong in structure and light in weight and being especially suitable for use by persons shipping various types of goods or items, and wherein the container can be made in different sizes, and wherein the container is especially suitable for receiving items that are to have a minimum amount of exposure to air, dust or the like since the container can be made practically air and dust proof.

Still another object is to provide such a container that is economical to manufacture and efficient in operation and which is rugged in structure and foolproof in use.

These and other objects of the invention will become apparent from a reading of the following specification and claims, together with the accompanying drawings, wherein like parts are referred to and indicated by like reference characters and wherein:

FIGURES 6, 7, 8, and 9 are elevational views illustrating the four side members.

Figure 10:
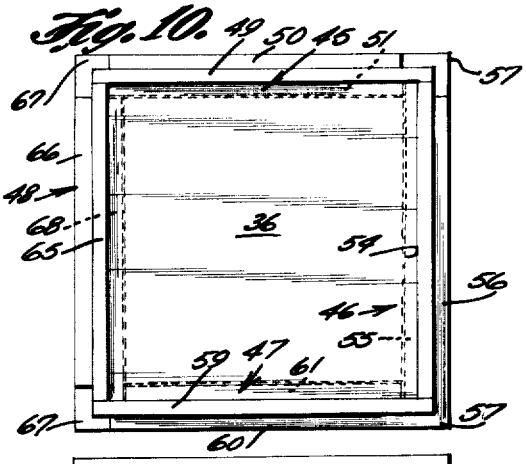

FIGURE 10 is a top plan view of the assembled container, with the cover removed.

Figure 11:
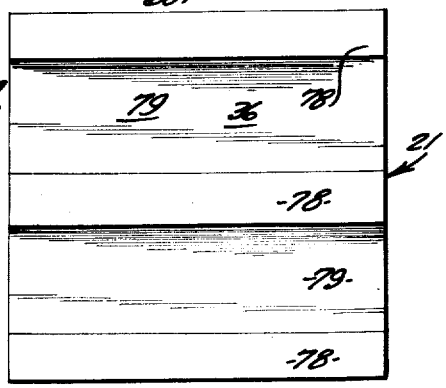

FIGURE 11 is a bottom plan view of the base.

Figure 12:
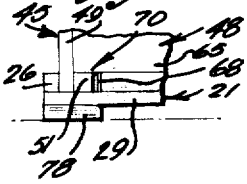

FIGURE 12 is a fragmentary elevational view, with parts broken away showing a notch in a corner of one of the side members which permits the parts to be assembled and disassembled.

Figure 13:
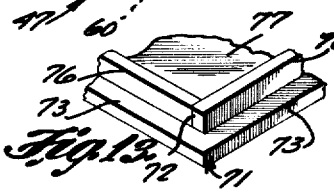

FIGURE 13 is a fragmentary perspective view showing a lower corner portion of the cover.

Figure 14:
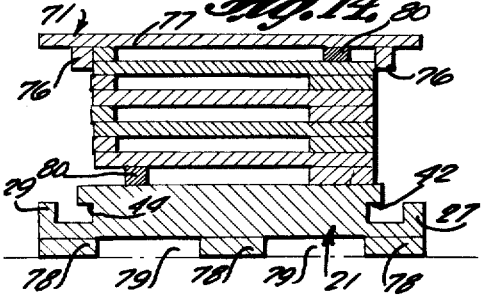

FIGURE 14 is a vertical sectional view illustrating the stacking of the parts of the container as, for example, when the container is not being used it can be disassembled and the parts stacked one upon the other so as to occupy a minimum amount of space for storage or shipment.

Figure 1:
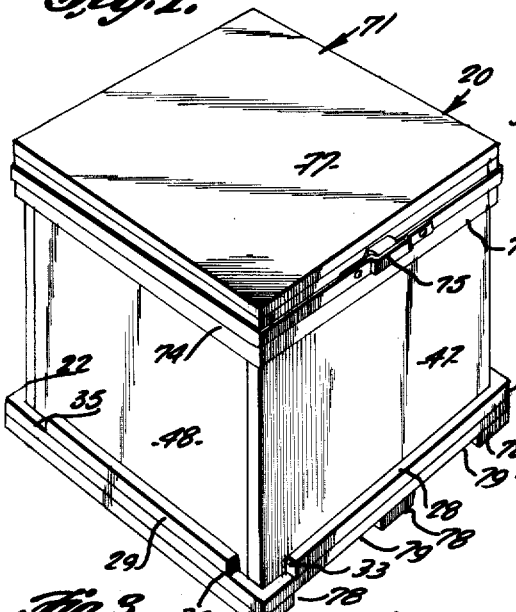
FIGURE 1 is a perspective view of the assembled container of the present invention.
Figure 2:
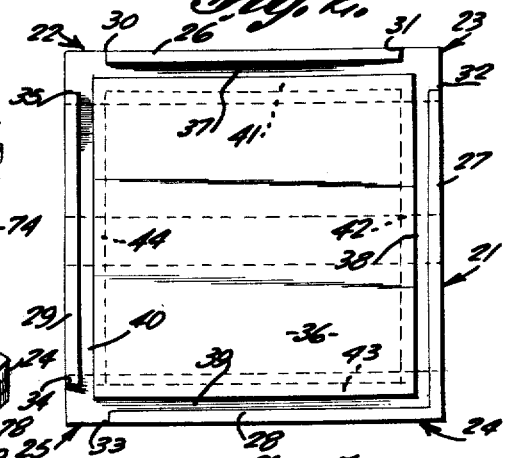
FIGURE 2 is a top plan view of the base per se.
Figure 3:
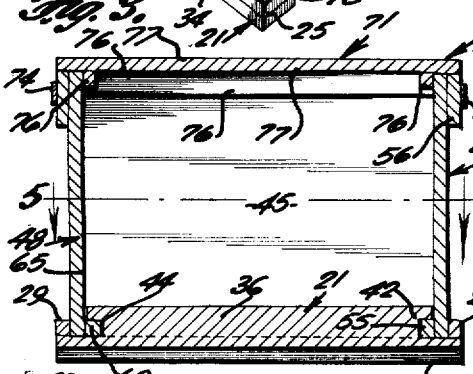
FIGURE 3 is a vertical sectional view taken through the assembled container or box.

Referring in detail to the drawings, the numeral 20 in FIGURE 1 illustrates the assembled container or box of the present invention which is shown to comprise a horizontally disposed base that is indicated generally by the numeral 21, FIGURE 2. The base 21 is of rectangular formation and includes first, second, third and fourth corner portions as indicated by the numerals 22, 23, 24 and 25. The base 21 is also shaped to include vertically disposed flanges, and it will be seen that these flanges are arranged adjacent the outer edge portions of the base. The first flange 26 has its ends terminating at points as indicated by the numerals 30 and 31, and these points 30 and 31 are spaced inwardly from the first and second corner portions 22 and 23. The numeral 27 indicates a second flange which has one end 32 spaced inwardly from the second corner portion 23, and the other end of the flange 27 extends all the way to the third corner portion 24. The third flange 28 extends from the third corner portion 24 to a portion of the way across so that an end of the third flange 28 terminates at the point 33 which is spaced inwardly from the apex of the fourth corner portion 25. The fourth flange 29 has both of its ends spaced inwardly from the adjacent corner portions, as for example the fourth flange 29 has one end terminating at a point 34 that is spaced inwardly from the apex of the fourth corner portion 25, and the other end as indicated by the numeral 35 of the fourth flange 29 is spaced from the apex of the first corner portion 22, for a purpose to be later described.

The base 21 further includes a central rectangular main body section 36, and there is defined between the outer edges of the main body section 36 and the flanges, grooves indicated by the numerals 37, 38, 39, and 40. The main body section of the base 21 is recessed below the outer edge portions of the main body section so as to define or provide recesses indicated by the numerals 41, 42, 43, and 44.

Figure 5:
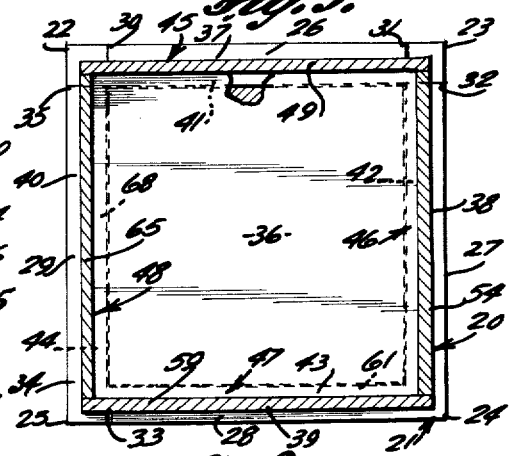
FIGURE 5 is a sectional view taken on the line 5—5 of FIGURE 3.

There is further provided four side members or side panels so that with the container assembled as, for example, as shown in FIGURE 5 the numerals 45, 46, 47, and 48 indicate or designate vertically disposed first, second, third and fourth side members respectively. Each of these side members is provided with a main body portion and has an enlarged horizontally disposed shoulder on its outer upper end portion, and each side member further includes a horizontally disposed tongue or lug portion on its lower inner end surface. Thus, referring to FIGURE 6 of the drawing it will be seen that the first side member 45 includes a main body portion 49 which has an enlarged or thickened shoulder 50 on its upper outer end portion as well as a horizontally disposed tongue 51 on its lower inner end portion. The lower end portions of the side members are slidably engaged in the grooves of the base 21, and the tongues of the side members are adapted to be snugly received in the recesses below the outer edge portions of the main body section 36 of the base 21. The shoulder 50 of the first side member 45 has its ends flush with the adjacent outer edges of the side member 45 as shown in the drawings. The tongue 51 has one end flush with a lower side edge portion of the side member 45, while the other end of the tongue 51 terminates at a point 52 that is spaced inwardly from the adjacent vertical edge of the side member 45 so that there is defined or provided a space 53 between the end 52 and the outer vertical edge portion of the side member 45.

Figure 8:
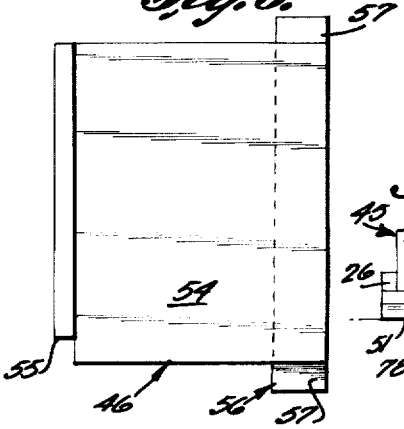

Attention is now directed to FIGURE 8 of the drawing wherein there is shown the second side member 46 which includes a main body portion 54 which is provided with a tongue 55 on the lower inner portion thereof, the tongue 55 extends completely across the bottom of the side member 46. The side member 46 is further provided by an enlarged or thickened shoulder 56 on the upper outer surface thereof, and end portions of the shoulder 56 extend beyond the outer side edges of the side member 46 and these extending end portions of the shoulder are indicated by the numeral 57.

Figure 9:
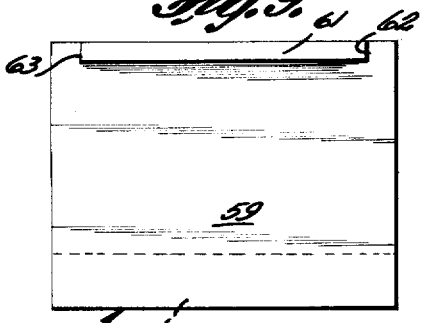

The third side member is shown in FIGURE 9 and is indicated generally by the numeral 47, and the third side member 47 includes a main body portion 59 which has a shoulder 60 on the upper outer portion thereof, and the ends of the shoulder 60 are flush with the outer vertical edges of the side member 47. The side member 47 further includes a horizontally disposed tongue 61 on the lower inner portion thereof, and the ends of the tongue 61 terminate at points 62 and 63 which are spaced inwardly from the adjacent vertical side edges of the side member 47.

Figure 7:
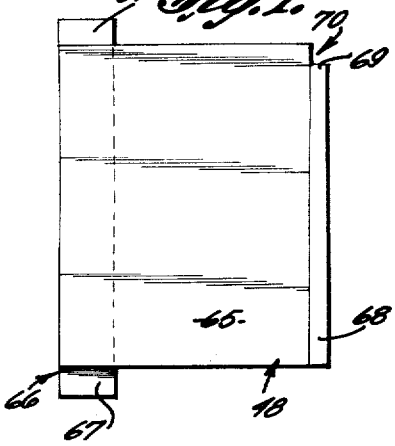

The fourth side member or side panel is illustrated in FIGURE 7 and is indicated by the numeral 48 and it will be seen that the side member 48 includes a main body portion 65 which has a shoulder 66 on the upper outer portion thereof, and the shoulder 66 has end portions 67 projecting or extending beyond the adjacent outer edges of the main body portion 65. The side member 48 is further provided with a horizontally disposed tongue 68 on the lower inner surface thereof, and one end of the tongue 68, is flush with an outer edge of the side member 48, while the other end of the tongue 68 terminates at a point 69 which is spaced inwardly from the opposite side edge of the member 48. The numeral 70 indicates a notch or cutout which is provided in the lower corner portion of the side member 48 adjacent the point 69.

Figure 4:
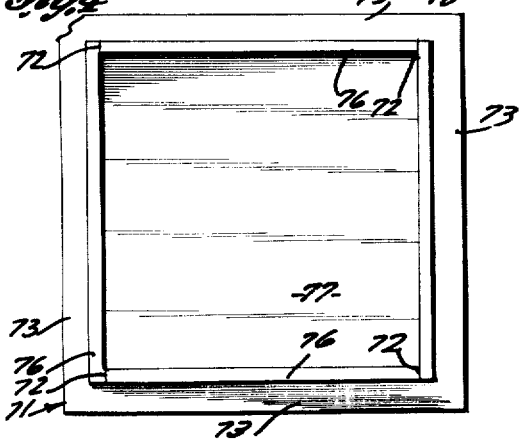
FIGURE 4 is a bottom plan view of the cover looking up at the bottom portion of the cover.
Figure 6:
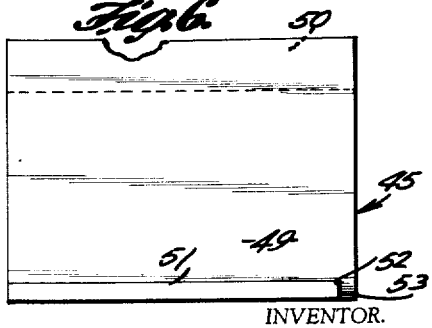

As shown in FIGURE 4 there is provided a cover or lid which is indicated generally by the numeral 71, and the cover 71 includes a rectangular main body portion 77 which has four depending vertically disposed ribs 76 that are arranged in rectangular formation, and the meeting end portions of the ribs 76 abut each other as shown in FIGURE 4 and this construction helps insure that the parts such as the cover can be made with a minimum amount of expense since by having such abutting junctions 72, expensive beveled edges or overlapping seams or end portions are eliminated. The ribs 76 are secured to or formed integral with the main body portion 77 of the cover 71, and these ribs 76 are spaced inwardly from the outer edges 73 of the cover as shown in the drawings, so that when the container is assembled the upper inner portions of the side members will abut or engage the outer surfaces of the ribs 76 and with the parts in such assembled position the outer surfaces of the shoulders of the side members will be flush with the outer edge portions of the cover and thus there will be no overhanging portions on the cover extending beyond the side members. The numeral 74 indicates a band or strap which may be made of metal or the like and this metal band or tying member as indicated by the numeral 74 is adapted to be extended around the four shoulders of the side members as, for example, as shown in FIGURE 1 in order to retain the parts in their proper assembled position, and the band 74 may be provided with a conventional clamp or securing element 75 for preventing accidental disengagement or separation of the band.

Referring to FIGURE 11 of the drawings, it will be seen that the bottom of the base 21 is provided with a plurality of spaced parallel cleats 78 which define spaces 79 therebetween.

In FIGURE 14 there is illustrated a manner or method of stacking the parts of the container as, for example, when a container is not being used the parts can be disassembled and stacked one upon the other so as to occupy a very small amount of space, and if desired or required, spacer members such as the spacer members 80 may be interposed between certain of the parts in order to help maintain such parts in a horizontal or level position when in their stacked relationship as shown in FIGURE 14.

From the foregoing, it is apparent that there has been provided a container which is adapted to be used for various purposes, as for example the present invention can be used as a shipping container so that various types of articles can be positioned within the container and stored or shipped in a highly convenient manner to a desired location. With the parts arranged as shown in the drawings, it will be seen that the container includes a base 21 as well as a top member or cover 71, and there is also provided a plurality of vertically disposed side members which are interlocked with the base and cover, and the band 74 surrounds the upper portions of the side members whereby the entire structure will be held in assembled position. The base 21 is provided with the flanges 26, 27, 28 and 29 as well as the grooves 37, 38, 39 and 40, and there is provided the recesses 41, 42, 43 and 44. The side members have the tongues in their lower inner portions and the shoulders on their upper outer portions as previously stated, and these offset tongues and shoulders are such that when the container is assembled, the tongues will snugly fit in the recesses so that the side members will be interlocked with the base. In addition, the flanges are arranged so that certain of the flanges are positioned whereby adjacent ends are spaced from each other while other flanges have contiguous ends so that with this construction sufficient clearance is provided in order to permit convenient assembly or disassembly of the container as desired and wherein with the container assembled accidental separation or disengagement of the parts will be prevented. After the side members have been interlocked with the base, the cover 71 is positioned on the upper ends of the side members so that the ribs 76 will be arranged in engagement with the upper inner surfaces of the side members and this construction together with the construction of the base insures that the side members will not buckle or move out of their proper position, and by positioning the band 74 around the shoulders of the side members the completed container will be maintained in the assembled position.

When the container is not needed or when it is not being used, the parts can be disassembled and stacked as, for example, as shown in FIGURE 14 and the various side members can be stacked one upon the other on top of the base 21, and the cover member 71 can then be mounted above the side members.

As shown in FIGURE 12 the notch 70 provides clearance space whereby the tongue 51 and side member 45 can slide through this notch 70 in order to permit assembly or disassembly of the container. As shown in FIGURE 2 the corner portion 24 is closed, while the corner portions 22, 23 and 25 are of generally open construction so that the desired assembly or disassembly can take place.

The parts can be made of any suitable material and in different shapes or sizes.

The provision of the undercut recesses in the base and the flanges on the base provide a means for releasably locking the side members to the base in such a manner that the side members cannot buckle or spread out from their proper position.

The parts are made in such a manner that they will properly fit together and interlock or interengage. The shoulders help reinforce the upper portions of the side members and also certain of the shoulders have extending end portions as indicated by the numerals 57 and 67 and these extending end portions interengage or abut the ends of the shoulders of the adjacent side members in order to maintain the parts in their proper aligned position. When disassembling the container, the band 74 is first removed, and then the side member 45 is slid out from engagement with the base, and then the side members such as the side members 46 and 48 are slid out from engagement with the base through the open corners of the base, and then the side member 47 may be disengaged or slid out of engagement with the base, it being understood that the cover 71 is removed from off of the side members after the band and before it is disconnected. Similarly, when assembling the container the reverse procedure is followed so that the side member 47 can be first engaged with the base, and then the other side members 46 and 48 are connected to the base and the last side member to be connected to the base will be the side member 45 so that the side member 45 is the first side member to be removed when taking the container apart, and the side member 45 is the last side member to be inserted when assembling the container.

One of the most important aspects or features of the container of the present invention is the economy that can be realized by using the same or making same as previously stated. The side members of the container are adapted to be interlocked to the base and cover, and as shown in FIGURE 14 the parts are adapted to be interlocked and stacked together when not being used so that a minimum amount of space will be required for shipment, storage or the like. The container is very easy to reassemble because the last piece taken out is the first to be used in reassembling the device and reassembly can be readily accomplished without the necessity of using nails or other securing elements as only one metal band is needed around the top of the container or box, and the tighter the band the stronger will be the sides, top and bottom. Disassembly is readily accomplished by sliding the side member 45 in a direction from the corner 23 towards the corner 22, and then the side member 48 slides from the corner 25 to corner 22, and then the side member 46 slides from the corner 24 to corner 23, and finally the side member 47 slides from corner 24 to corner 25, and the exact reverse of this procedure is used to reassemble the container.

The base is constructed so that the side members will not collapse or bulge out, and the side members will not move from their proper positions. The side members each have a different construction from each other and these side members are provided with definite offsets and overhangs such as the tongues and shoulders so that the parts can interlock with each other. The cover can be banded on or it can be simply set on the tops of the side members and if the cover is just set on it will not slide off, due to the provision of the ribs 76 on the cover. The parts can be made of suitable material such as plywood, metal, wooden slats or the like, and by using plywood, or metal, the container can be made practically air and dust proof. Component parts can be purchased and replaced separately so that in the event that a single element or piece needs replacement, it is not necessary to purchase an entire new container. The container can be purchased and economically used by shippers or the like, and various items can be shipped or positioned in the container, and the container can be made in different sizes as desired, and the container is extremely strong and light in weight. The notch 70 provides clearance for the tongue 51 of the side member 45 whereby the proper assembly and disassembly of the container can be accomplished. In order to take apart these containers it is first necessary to slide out the side member 45, and unless this side member is first removed the other side members cannot be taken apart since they are locked in by the side member 45.

The box may be used without the cleats on the base if it is so desired.

Minor changes in shape, size and rearrangement of details coming within the field of invention claimed may be resorted to in actual practice, if desired.

What is claimed is:

1. A container comprising a horizontally disposed base of rectangular formation and said base including first, second, third and fourth corner portions, first, second, third and fourth vertically disposed flanges adjacent the outer edge portions of the base; said first flange having its ends terminating at points spaced inwardly from the first and second corner portions, said second flange having one end thereof spaced from said second corner portion and its other end extending all the way to the third corner portion, said third flange extending from the third corner portion to a point spaced inwardly from the fourth corner portion; said fourth flange having its ends spaced inwardly from the first and fourth corner portions of said base; said base further including a central rectangular main body section, there being grooves defined between the outer edges of the main body section and said flanges, said main body section being recessed below the outer edge portions of the main body section; first, second, third and fourth vertically disposed side members each including a main body portion having an enlarged horizontally disposed shoulder on its upper outer end portion and a horizontally disposed tongue on its lower inner end portion, the lower end portions of the side members being slidably engaged in the grooves in the base, said tongues being received in the recessed portions below the outer edges of the main body section of the base; the shoulders of the first and third side members having ends arranged flush with the adjacent outer edges of the respective side members, the tongue of the first side member having one end flush with the adjacent outer edge of the side member and the opposite end of the tongue being spaced inwardly from the adjacent outer edge portion of the first side member; the shoulder of the second and fourth side members extending beyond the adjacent outer edge portions of the side members, the tongue of the second side member extending completely across the lower inner portion of the second side member so that the ends of the last named tongue are flush with the outer side edges of the second side member, the tongue of the third side member having both of its ends spaced inwardly from the adjacent outer edge portions of the third side member; the tongue of the fourth side member having one end flush with the outer edge portion of the fourth side member and its other end terminating at a point spaced inwardly from the adjacent outer edge portion of the fourth side member, there being a notch in a lower corner portion of said fourth side member, said notch being arranged contiguous to the corner where the tongue of the fourth side member is spaced inwardly from the corresponding outer edge portion [; a horizontally disposed cover of rectangular formation mounted on said side members and said cover including a plurality of abutting vertically disposed ribs arranged in rectangular formation, said ribs being spaced inwardly from the outer edge portions of the cover, and the upper inner portions of the side members engaging the outer surfaces of said ribs].

[2. A structure as defined in claim 1 wherein the outer surfaces of said shoulders are flush with the outer edges of the cover.]

3. A structure as defined in claim 1 and further including a band surrounding the shoulders of said first, second, third and fourth side members.

References Cited in the file of this patent or the original patent

UNITED STATES PATENTS 871,802 Johnson et al. ---------- Nov. 26, 1907

1,045,412 Kling ---------- Nov. 26, 1912
1,273,430 Ward ---------- July 23, 1918
1,834,553 Seabold ---------- Dec. 1, 1931
2,137,142 Nelson et al. ---------- Nov. 15, 1938
2,511,958 Williams ---------- June 20, 1950
2,743,010 Koester ---------- Apr. 24, 1956
2,862,640 Somavia ---------- Dec. 2, 1958